United States Patent [19]

Pearson et al.

[11] Patent Number: 4,744,408
[45] Date of Patent: May 17, 1988

[54] TEMPERATURE CONTROL METHOD AND APPARATUS

[75] Inventors: Wayne K. Pearson, North Attleboro; Charles E. Cordino, Jr., Plymouth, both of Mass.

[73] Assignee: Herzog-Hart Corporation, Boston, Mass.

[21] Appl. No.: 676,667

[22] Filed: Nov. 30, 1984

[51] Int. Cl.$^4$ .............................................. F25B 13/00
[52] U.S. Cl. .......................................... 165/2; 62/179; 62/185; 62/201; 165/65
[58] Field of Search ................. 62/179, 185, 201, 332; 165/39, 2, 65, 31

[56] References Cited

U.S. PATENT DOCUMENTS

| | | | |
|---|---|---|---|
| 4,233,817 | 11/1980 | Toth | 62/332 X |
| 4,313,310 | 2/1982 | Kobayashi et al. | 62/332 X |
| 4,476,867 | 10/1984 | Parks | 165/30 X |
| 4,547,977 | 10/1985 | Tenedini et al. | 165/65 |

Primary Examiner—William E. Wayner
Attorney, Agent, or Firm—Wolf, Greenfield & Sacks

[57] ABSTRACT

A control system controls the temperature of a chemical process vessel by recirculating a heat transfer medium through a jacket surrounding the vessel. In order to control the temperature of the recirculating medium, the control system uses an internal cooling heat exchanger connected in series with an internal heating heat exchanger and can also connect the recirculating loop to a central refrigeration system. Operation of the heat exchangers and connections to the central refrigeration system are automatically controlled by a computer which selects the cooling method in order to minimize energy use while maintaining the selected temperature. The computer also monitors the inlet and internal temperatures of the vessel and the outlet temperature of the cooling heat exchanger to prevent thermal shock damage when the system changes between heating and cooling during operation.

17 Claims, 6 Drawing Sheets

TEMPERATURE CONTROL METHOD AND APPARATUS

FIELD OF THE INVENTION

This invention relates to a method and apparatus for controlling the temperature of a vessel, such as a chemical process vessel.

BACKGROUND OF THE INVENTION

It is often necessary in manufacturing operations to accurately control the temperature of one or more parts of the manufacturing process. Usually such control is critical to the success of the operation. In some operations the temperature must be varied in a predetermined way during the manufacturing process. For example, commercial chemical manufacturing processes are often carried out in a "batch" process. In such a process, chemical reactants are placed in a reactor vessel and and subjected to varying temperatures and reagents to produce a resultant compound.

Often the temperature of either the reaction vessel or the chemical mixture within must be controlled to a precise predetermined temperature in order to insure that the chemical reaction takes place properly.

In conventional chemical process systems, in order to control the temperature of the reaction vessel, the vessel is surrounded by an outer jacket through which a heat transfer medium is circulated. The temperature of the heat transfer medium which determines the temperature of the vessel is, in turn, controlled by means of temperature control apparatus.

The temperature control apparatus typically pumps the heat transfer medium through the reactor jacket and responds to signals from temperature sensors which sense the temperature of the vessel jacket and the chemical reactant batch. In response to the sensor signals the temperature control system provides the vessel with a medium which either heats or cools the chemical batch to maintain its temperature at a specified point.

Generally, in a large manufacturing plant, central heating and refrigeration plants are used to provide heat and remove heat from a plurality of reaction vessels in the plant. These central plants provide heat transfer media at predetermined temperatures. Consequently, many prior art temperature control systems simply circulate the appropriate heat transfer medium through the reactor jacket to provide the necessary heating or cooling. Since these control systems were made to operate with existing heating and cooling plants they were most often custom built for each reactor vessel.

These latter temperature control systems had severe problems if accurate temperature control was necessary or if the chemical batch mixture had to be heated during one portion of the process and cooled during another portion of the process so that rapid switching between heating and cooling media was necessary. In this latter situation, the reactor vessel jacket had to be flushed during each switch from heating medium to cooling medium if the media were not compatible, as was often the case. Even with flushing between switches, cross-contamination usually occurred causing sludge and corrosion problems.

To overcome the flushing and contamination problems, temperature control systems have been developed which use a single recirculating heat transfer medium and heat or cool the medium by means of heat exchangers to control temperature.

Some of these known single-medium systems utilize a heat exchanger in the recirculating loop to heat the transfer medium and can be connected to the central cooling plant to cool the recirculating medium. Other conventional temperature control systems utilize two heat exchange units connected in parallel to perform the heating and cooling function. One heat exchanger is provided with a cooling medium from the central plant and the other heat exchanger is provided with heating medium from the central plant. Since there is no intermixing of the heating and cooling media, cross-contamination is eliminated.

These latter control systems also had an additional advantage in that they could be manufactured as modular, self-contained systems and thus the expense for providing such a system was reduced over the conventional custom-built systems.

However, even such temperature control systems with one heat transfer medium have problems. First, it was found that neither the direct connection of the loop to the central cooling plant nor the parallel connection of heat exchangers could control the recirculating medium temperature to an accuracy sufficient for certain processes. Secondly, in order to provide sufficient capacity to accurately control the temperature of a given size reactor vessel, single-medium temperature control systems which utilized parallel heat exchangers had to use heat exchangers which could handle the maximum heat load generated by the vessel. If the vessel was not generating the maximum heat load, conventional single-medium, parallel-heat exchanger temperature control systems wasted energy because there was no way to tap directly into the central heating or cooling plants to handle peak heat load situations.

Another problem with single-medium systems was that they could damage the reactor vessel. Many reactor vessels are lined with glass because of the corrosive nature of the reacting materials and the glass liner is subject to damage by large temperature differentials. Such differentials can occur when a single-medium system switches between a cooling mode and a heating mode.

Accordingly, it is an object of the present invention, to provide a temperature control system which can control the temperature of a manufacturing vessel to an accuracy sufficient for most manufacturing processes.

It is another object of the present invention to provide a temperature control system which can operate directly with central heating and cooling plants to provide increased capacity during peak heat loads.

It is still another object of the present invention to provide a temperature control system which can conserve energy by utilizing the cheapest heating or cooling method available.

It is yet another object of the present invention to provide a temperature control system which can protect manufacturing vessels from damage due to thermal stress.

It is a further object of the present invention to provide a temperature control system which is electronically-controlled.

It is yet another object of the present invention to provide a temperature control system having an explosion-proof control unit located in the vessel area and a remote electronic control unit located in a non-hazardous area which can operate the control unit by means of the control signals.

It is a still a further object of the present invention to provide a temperature control system which can be quickly and easily reprogrammed to accommodate different manufacturing processes.

SUMMARY OF THE INVENTION

The foregoing objects are achieved and the foregoing problems are solved in one illustrative embodiment of the invention in which a temperature control system uses a recirculating single-medium heat transfer loop which has a heating heat exchanger and a cooling heat exchanger connected within the loop in series. In addition, the recirculating loop can be broken and connected to a central refrigeration plant. Valves controlling the heat sources and sinks connected to the heat exchangers and the injection of coolant from the central refrigeration system are controlled by a computerized controller. The controller monitors the vessel temperature, the process batch temperature and the inlet and outlet temperatures of the cooling medium at the cooling heat exchanger and controls the heat exchangers and the connection to the central refrigeration system so that the system uses the least costly energy resource to maintain the specified temperature.

The controller also monitors the cooling heat exchanger to drain the coolant out of the exchanger when it is not being used to prevent damage to the exchanger by boiling or freezing of the coolant in the exchanger.

The controller further monitors the inlet temperature of the vessel jacket and the vessel internal temperature and controls the heating and cooling of the recirculating medium to prevent damage to the vessel liner due to a large temperature differential.

DETAILED DESCRIPTION OF THE PREFERRED EMBODIMENT

Figure 1:
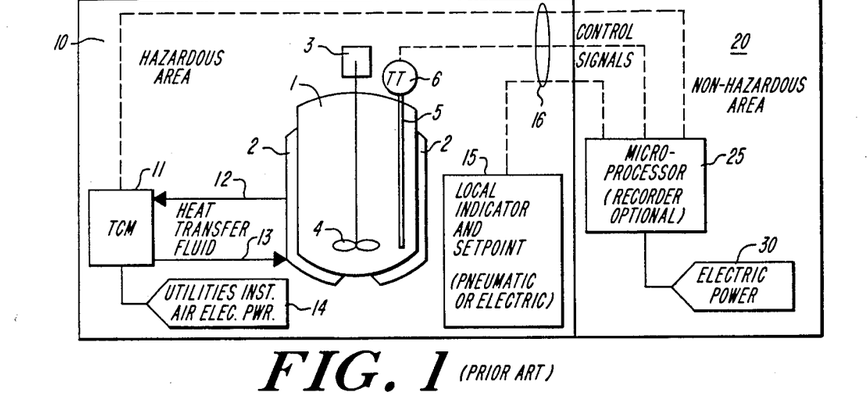
FIG. 1 shows a typical arrangement of a prior art modular temperature control system controlled by a remote computerized controller.

FIG. 1 shows a schematic diagram of a conventional chemical reactor vessel temperature control system which uses a single recirculating heat transfer medium. Reactor vessel 1 is typically a metal or glass lined vessel which may be on the order of several gallons to several hundred thousand gallons in capacity. The reactor vessel is encircled with a jacket 2 in which the heat transfer fluid circulates. Jacket 2 is closely connected to vessel 1 to improve heat transfer between jacket 2 and vessel 1. Jacket 2 may also be insulated on its outer surface to prevent heat loss and conserve energy.

Reactor vessel 1 may be also provided with mechanical stirrers consisting of stirrer blades 4 and driving motor 3. Also provided in vessel 1 is a temperature probe 5 which is connected to a temperature transmitter 6. Probe 5 is generally a resistance probe which may be a thermocouple or other conventional temperature sensing device. Transmitter 6 converts the signal produced by the probe into an electrical signal which is sent, via one of control signal leads 16, to a remote microprocessor controller 25. Transmitter 6 is also a well-known device.

Microprocessor controller 25 is often separated from the reactor vessel 1 to eliminate the possibility of explosion. More particularly, in many chemical processes volatile solvents are used in the chemical process, which solvents can create a hazardous atmosphere that is subject to explosion if electrical sparks are present. Thus, equipment located in the hazardous area 10 must be conventional explosion-proof equipment or must be pneumatically operated. The controller 25 which presents the possibility of electrical sparks, is removed to a non-hazardous remote area 20 and monitors the process and controls temperature control module 11 by means of signals passed over leads 16.

Microprocessor 25 may also include a chart recorder which records a permanent record of the values of the various temperatures or set points for later reference. Processor 25 may also provide indicating signals of the various temperatures to a local station 15 in the hazardous area which indicating signals can be read by operating personnel. Microprocessor 25 receives electrical power from source 30 in order to operate its various components.

The temperature of the heat transfer fluid and, thus, the temperature of reactor vessel 1 is controlled by temperature control module 11 which recirculates a heat transfer fluid through jacket 2 by means of pipes 12 and 13. Module 11 is provided with electric power and connected to the central heating and cooling plants labeled schematically as arrow 14.

Figure 2:
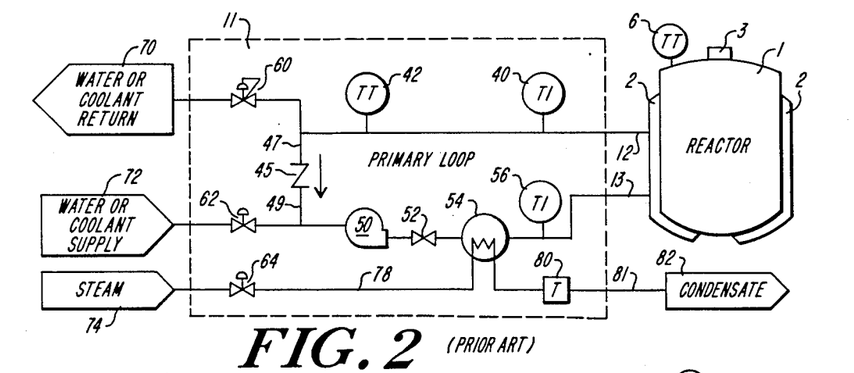
FIG. 2 is a schematic diagram of the heat transfer fluid flow loop in a typical prior art single-medium temperature control system.

FIG. 2 shows a more detailed diagram of temperature control module 11 which is shown in the dotted box. In particular, a heat transfer medium is circulated in a primary fluid loop consisting of pipes 12, 47, 49 and 13. A check valve 45 insures that the heat transfer fluid will circulate in the proper direction. The heat transfer medium is typically a fluid. The composition of this fluid depends on the particular process to be controlled and the temperatures involved. Typical fluids used are water, ethylene glycol/water mixtures and various proprietary fluids such as DOWTHERM heat transfer fluid manufactured by the Dow Chemical Company.

Heat transfer fluid exiting from jacket 2 is provided to pipe 12 of the primary loop. The temperature of the exiting fluid may be monitored by a temperature indicator 40 directly by operating personnel or converted into an electrical signal by temperature transmitter 42 for transmission to the remote microprocessor controller. The fluid is kept circulating in the primary loop by means of pump 50 which circulates the fluid via control valve 52 through heat exchanger 54 to pipe 13.

Heat exchanger 54 is, in turn, connected to a steam source 74. In order to control the heating of the primary loop fluid, the introduction of steam into heat exchanger 54 is controlled by valve 64 which is, in turn, operated by the microprocessor controller. After passing through valve 64 the steam flows via pipe 78 to heat exchanger 54. The condensate resulting from the spent steam is removed via trap 80 and pipe 81 to a condensate drain 82.

In order to cool the heat transfer fluid in the system illustrated in FIG. 2, the primary loop is connected to a cooling water or refrigerant system via pipes 70 and 72. When cooling water or refrigerant is to be injected into the system to cool the recirculating medium, the computer controller opens valves 60 and 62. Valve 62 is the throttling valve type which can be controlled in a proportional manner to control the flow of incoming coolant into the primary loop. Valve 60 is a spring action valve which is fully opened when valve 62 is actuated. Valve 60 is closed when valve 62 is fully deactuated to disconnect the primary loop from the coolant system.

Figure 3:
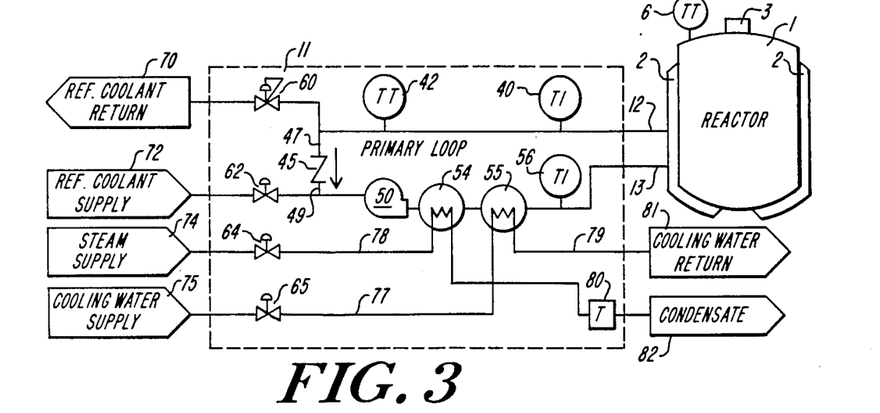
FIG. 3 is a schematic diagram of the heat transfer fluid loop in the inventive temperature control system.

FIG. 3 of the drawing shows the arrangement of a temperature control module 11 constructed in accordance with the present invention. The illustrative temperature control module is similar in basic construction to the prior art design shown in FIG. 2 with the exception that an additional heat exchanger, 55, has been added in series with the heat exchanger 54 and the microprocessor controller is programmed to automatically control the system as will hereinafter be described. Heat exchanger 55 is connected, via valve 65 and pipe 77 to a cooling water supply 75 and to a cooling water return (81) via pipe 79. Thus, the primary loop may be cooled either by controlling the flow of cooling water in heat exchanger 55 or by injecting refrigerated coolant from supply 72 into the primary loop as discussed in connection with FIG. 2.

In accordance with one aspect of the invention, the choice of using cooling water or refrigerated coolant allows the less-expensive cooling resource (generally the water cooling) to be used to cool processes which do not require the high heat-removal capabilities of the refrigerant system. As will be hereinafter discussed in detail, the illustrative system switches between the central refrigerant system and the central cooling water system in accordance with the heat removal demands of the system (as determined by the temperature of the cooling water supply and the temperature of reactor 1) in order to save energy by using the least expensive cooling resource as much as possible.

Also, in accordance with the invention, software control is provided in the microprocessor which senses the temperature differential between the incoming heat transfer fluid at jacket 2 and the reactor temperature to prevent a large temperature differential from occurring which could damage a glass-lined reactor vessel.

Further, in accordance with the invention, heat exchanger 55 is controlled so that the cooling water is automatically drained out of the heat exchanger whenever the heat exchanger is not in use (and the heat exchanger outlet temperature falls outside of predefined limits), preventing the cooling water from boiling or freezing and damaging the heat exchanger.

Figure 4:
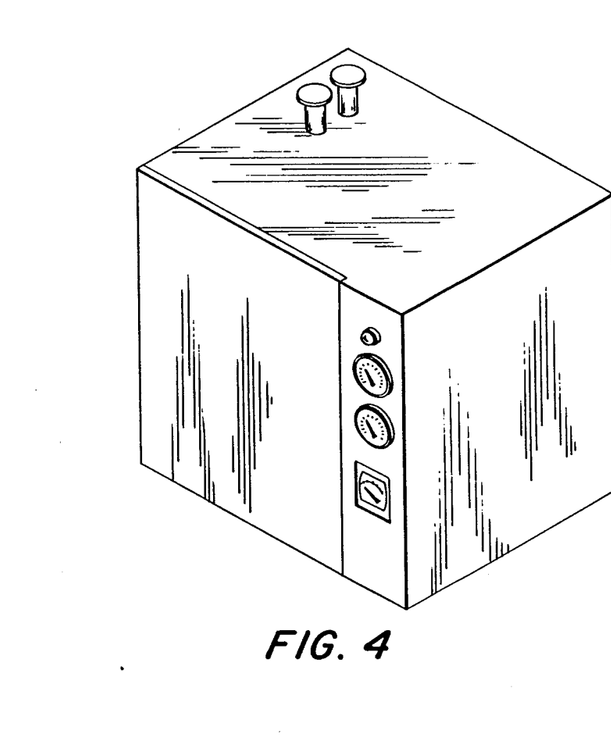
FIG. 4 is a perspective view of the inventive temperature control system showing modular construction.
Figure 5:
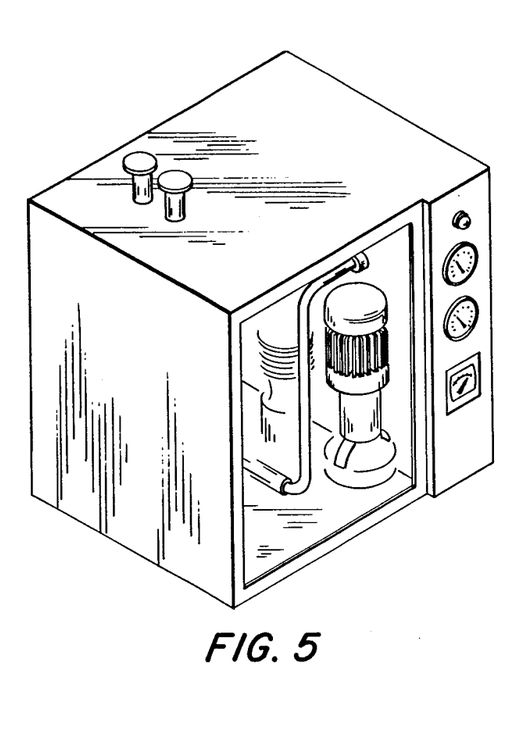
FIG. 5 is a perspective view of the temperature control system with the external covers removed to show the internal piping.

FIG. 4 of the drawing shows a perspective view of a temperature control system constructed in accordance with the invention. The system is completely modular and self-contained and needs only to be connected to external refrigeration system, a source of cooling water and a steam source. FIG. 5 of the drawing is a perspective drawing of the illustrative temperature control module with its external covers removed to show the centrifugal pump 50 and the various piping used to control the circulation of the transfer fluid.

The modular system shown in FIGS. 4 and 5 is designed to be used with a remote commercial microprocessor controller (not shown). A typical microprocessor controller which is suitable for use with the illustrative invention is a Model CL6003 interactive controller unit manufactured by Fisher Controls Inc., located in Marshalltown, Iowa. The Fisher type CL6003 interactive controller unit consists of various card assemblies and interconnector assemblies which can be combined to form an interactive controller system. The interactive controller contains a microprocessor card which employees a high-speed microprocessor for performing computations and data handling. The microprocessor contains seven analog input ports which can receive analog input signals from devices such as the temperature transmitters and convert the signals internally into a digital signal which is used by the microprocessor. The microprocessor also contains four discrete inputs (contact closures) which can detect the state of four separate switches. The controller has seven analog outputs which can be used to control proportional valves or provide setpoint information to control devices, and four discrete outputs which can be used to control open/close valves in the system. As will be hereinafter described in detail, the controller is programmed in a conventional manner to perform the functions that are necessary to control the fluid flow within the primary loop of the temperature control module.

Figure 6:
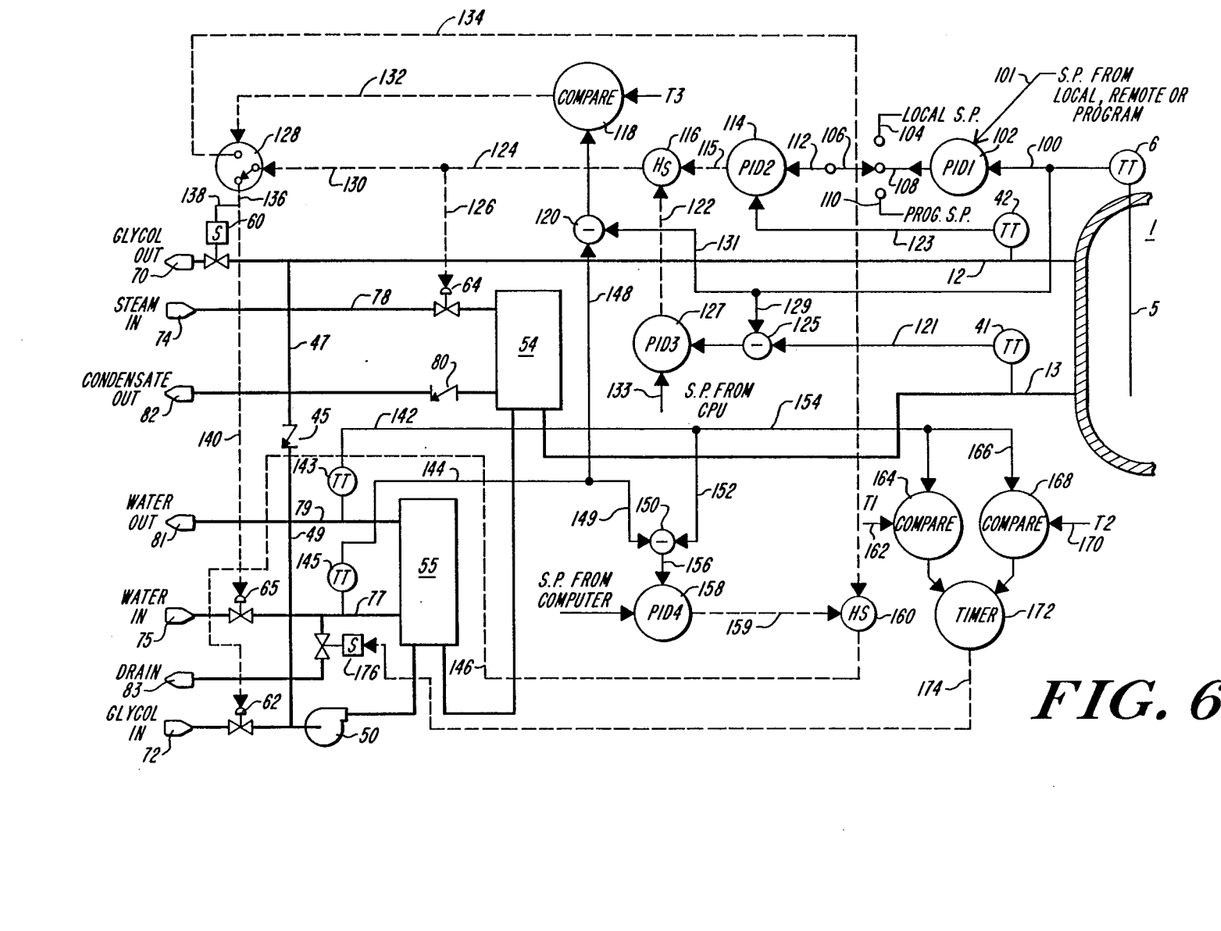
FIG. 6 is a schematic diagram showing the fluid flow loops and the electrical control signals which operate the illustrative temperature control system.

FIG. 6 of the drawing shows a detailed control schematic of the heat transfer fluid flow loops between reactor 1 and heat exchangers 54 and 55. FIG. 6 also indicates, in schematic form, the functions performed by the microprocessor controller in controlling the various components of the system in accordance with the invention.

In particular, reactor 1 (shown at the right hand side of FIG. 6) is surrounded by a temperature control jacket 2 through which is pumped a heat transfer fluid by means of pipes 12 and 13. In the embodiment shown in FIG. 6, this heat transfer fluid consists of an ethylene glycol/water mixture. The temperatures of various portions of the system are monitored by five temperature transmitters, 6, 41, 42, 143 and 145.

Transmitter 6 is connected to probe 5 which measures the "batch" temperature of the reactant mix in reactor 1 and produces an output signal on line 100. The temperature of the fluid inlet on pipe 13 is monitored by transmitter 41 which produces an output signal on line 121. The output temperature of the heat transfer fluid at pipe 12 is measured by transmitter 42 which produces an output signal on line 123. Similarly, the inlet and outlet temperatures of the cooling water provided to, and drawn from, heat exchanger 55 are measured by temperature transmitters 145 and 143 respectively. These transmitters generate output signals on lines 144 and 142, respectively. The output of these temperature transmitters are used as inputs to the microprocessor controller which, in turn, develops control signals that control the various flow control valves, 62, 64 and 65.

In particular, the illustrative control system can be operated in two "modes"—the "batch" mode and the "jacket" mode. In the batch temperature control mode, the control system operates to hold the temperature of the reactant mix in reactor 1 at a predetermined temperature. In the jacket temperature control mode the system operates to keep the temperature of the reactor vessel jacket at a predetermined temperature.

Assuming the system is operating in the "batch" mode, the output of temperature transmitter 6 on line 100 is provided to temperature control PID function, diagrammed as function 102. Function 102 and the other functions depicted as circles in FIG. 6 schematically depict a specified functions rather than physical elements. The functions may be actually implemented in a variety of ways. For example, function 102 may be implemented by a mechanical controller, a hard-wired electrical controller or by a computer program routine in the microprocessor controller. The implementation is not important to the present invention as long as the proper function is performed by the implementation. In the illustrative embodiment the circled functions are implemented by program routines in the microprocessor controller.

Function 102 schematically describes a conventional control function known as a PID loop function. The purpose of this function is to generate a control output which can be used to control the system to change the value of a selected system variable to a desired "setpoint" value. To this end the function accepts a measurement input (which is representative of the actual value at a particular time of the controlled system variable) and a setpoint input which is the desired value of the controlled variable.

The measurement and setpoint inputs are combined to produce an error signal which indicates the difference between the actual and desired values. Computations are then performed on the error signal to determine the output signal. These latter computations are standard control computations and determine how the controlled variable will approach the desired value. The output generated by the function may be either proportional (P) to the error, an integral (I) of the error signal, the differential (D) of the error signal or a combination of the three control arrangements (PID control).

In the illustrative embodiment, control function PID1 (element 102) represents a PID control function. Function 102 compares the measured value of the "batch" temperature from transmitter 6 to a setpoint signal provided to function 102 over line 101 from a potentiometer at either a local location or a remote location or a setpoint signal provided from the microprocessor controller. Based on these two inputs, function 102 calculates and generates an output signal on its output line (108) which signal can be used to control the system to maintain the batch temperature at the setpoint value provided to function 102 via line 101.

Although the output of function 102 could directly be used to control the system, the physical time constants of the heat transfer rate between the vessel jacket and the reactor contents require that a more sophisticated arrangement be used to control the batch temperature.

More particularly, output 108 of function 102 is provided via switch 106 and input line 112 as a setpoint value to PID loop 2 (element 114). Switch 106 controls the operating mode of the system. If the system is operating in the "batch" mode, switch 106 is set so that the setpoint of function 114 is provided from the output of function 102. If the system is operating in the jacket mode, the setpoint of function 114 is provided from either a local operator's console (via line 104) or from the microprocessor controller, via line 110.

Alternatively, in the jacket temperature mode, the temperature of the recirculating fluid in jacket 2 is controlled to the setpoint provided from the local position or the microprocessor controller independently from the temperature of the reactant mixture in vessel 1.

In the batch control mode, the setpoint input 112 of function 114 is connected to the output of function 102. The serial connection of two controllers is necessary because some reactor vessels have a poor heat transfer rate between jacket 2 and reactor vessel 1 and, thus, there is a long time lag between a change in the temperature of the recirculating medium in the jacket 2 and a corresponding change in the batch temperature in vessel 1. Since the control system operates at a relatively fast rate compared to the temperature change rates, the system would cause the temperature of the recirculating heat transfer fluid to fluctuate wildly in an attempt to control the temperature of the vessel contents.

Accordingly, the output of function 102, rather than directly controlling the primary temperature control loop, instead provides a setpoint value to function 114 which, in turn, controls the temperature of the recirculating heat transfer fluid. Thus, function 114 can respond rapidly to changes in the temperature of the heat transfer fluid to maintain the temperature of the primary loop close to the setpoint value determined by function 102 according to the batch temperature in vessel 1.

In order to control the temperature of the recirculating heat transfer fluid, function 114 receives a measurement input signal from output of 123 of temperature transmitter 42. Transmitter 42 mintors the temperature of the heat transfer fluid exiting from the outlet of jacket 2. Based on this input and the setpoint provided from function 102, function 114 generates an output to control the heat transfer fluid temperature so that it approaches the setpoint value determined by TC1.

During normal operation, output 115 of function 114 is provided, via high-select function 116, lines 124 and 130, switch 128 and line 136 to glycol control valve 62 (the operation of high-select function 116 and switch 128 will be described in detail hereinafter). Glycol control valve 62 is a proportional mechanical valve which responds to the output signal of function 114 (a current signal). The mechanical stroke of the valve shaft is adjusted so that the valve is completely open when the output of function 114 is 4 ma or less and completely closed when provided with an input of 12 ma or more. Between the 4 ma and 12 ma values the valve opening is proportional to the current input. Such valves are well-known and a valve suitable for use with the illustrative embodiment is a Model 1"-446 PMSW proportional valve manufactured by the Worchester Controls Company, 125 Hartwell Street, West Boylston, Mass.

01583. Thus, the output signal on line 136 from function 114 controls the amount of glycol refrigerant mixture introduced into the primary loop via port 72. Also connected to output line 136 is output line 138 which controls solenoid valve 60. This valve is arranged so that it is fully opened any time that valve 62 is actuated. This allows the glycol refrigerant introduced, via port 72, to be returned via port 70 to the central refrigerant system.

The output signal from high-select function 116 on line 124 is also used to control steam valve 64. Valve 64 is a mechanical proportional valve similar to glycol valve 62. However, the mechanical stroke of valve 64 is adjusted so that the valve is fully closed with an input signal of 12 ma. or less and fully open with an input signal of 20 ma. or more. Thus, the output signal of high-select 116 automatically switches between heating and cooling of the heat transfer fluid. If the output signal on line 124 is less than 12 ma. the glycol valve 62 is open and steam valve 64 is closed. As the output of function 116 climbs above 12 ma. glycol valve 62 closes and steam valve 64 opens.

In accordance with the invention, the normal operation of the control system is modified to provide additional features such as energy conservation and reactor vessel thermal protection. More particularly, in order to provide reactor vessel thermal protection, the inlet temperature of jacket 2 (at pipe 13) is monitored by temperature transmitter 41. The output of this temperature transmitter, on line 121, is provided to difference function 125.

Difference function 125 also receives the output of temperature transmitter 6, via lines 100 and 129. Function 125 supplies the absolute value of the temperature difference between the batch temperature in vessel 1 and the inlet port of jacket 2 to PID loop 3 (element 127). Function 127, in turn, generates an output signal which can be used to control the cooling system to bring the temperature differential developed by function 125 to a predetermined setpoint value stored in the microprocessor controller and provided to function 127 via line 133.

The output signal developed by function 127 is provided via line 122 to the high-select function 116. As previously described, high-select function 116 receives the output from function 114. High-select function 116 selects the higher-valued input signal and transmits the selected signal to switch 128 via lines 124 and 130.

Thus, under control of high-select function 116 the system operates in its normal mode with the output of function 114 determining the glycol coolant flow. As the temperature differential between the inlet port of jacket 2 and the internal reactor temperature (batch temperature) moves away from its corresponding setpoint, the output signal produced by function 127 will increase. If the signal generated by function 127 becomes larger than the signal produced by fucntion 114, high-select function 116 will cause the coolant flow to be controlled by function 127 which tends to reduce the reactor/jacket temperature differential to the setpoint value. When the reactor/jacket temperature differential has been brought sufficiently close to the setpoint temperature (thereby reducing the possibility of thermal damage to the reactor liner), the output of function 127 will fall below the output of function 114 which will then automatically resume control.

A similar modification of the normal cooling system operation is provided to allow the system to switch automatically between cooling provided from the central refrigerant system and water cooling provided by heat exchanger 55. In order to decide which cooling system to use, the system monitors the temperature differential between the reactor temperature (batch temperature) and the cooling water input port 77 of heat exchanger 55. When this temperature differential is less than a predetermined value (indicating that heat exchanger 55 can be efficiently used to cool the recirculating heat transfer fluid), the control output signal of function 114 is switched from glycol valve 62 to a control loop which, in turn, operates cooling water valve 65.

More particularly, the output signal of function 114 on lines 124 and 130 is provided to switch function 128 which can shift the output signal between lines 134 and 136. Switch function 128 is itself controlled via signal line 132 by compare function 118. Compare function 118 receives two inputs—one input is the setpoint value "T3" which is the temperature value at which the system switches from water cooling to refrigerant cooling. The other input to compare function 118 is provided by difference function 120.

Difference function 120, in turn, receives as inputs the batch temperature from transmitter 6 (via lines 100 and 131) and the cooling water inlet temperature from transmitter 145 (via lines 144 and 148).

When the temperature differential output of function 120 is more than the setpoint value T3, compare function 118 controls switch function 128 to shift the signal on lead 130 to signal line 134, thus, allowing function 114 to control cooling water valve 65. Alternatively, when the temperature differential between the jacket outlet and the cooling water inlet is less than setpoint T3 (indicating that heat exchanger 55 has insufficient capacity to handle the heat load generated by vessel 1), the output of function 114 is switched, via switch 128, to line 136 to directly control glycol valve 62 as previously described. Therefore, the system will automatically use heat exchanger 55 to cool the recirculating heat transfer fluid unless the capacity of exchanger 55 cannot handle the heat load at which time the central refrigeration plant is used.

Assuming for the moment that function 114 is to control cooling water valve 65, the output of function 114 is provided via switch function 128 to line 134. However, the output signal on line 134 does not directly control cooling water valve 65. Instead, the signal on line 134 is provided to high-select function 160. High-select function 160 also receives on line 159 the output of control loop function 158. Function 158 is used to improve the efficiency of heat exchanger 55 by overriding the control signals from function 114 in the event that the temperature differential of the cooling water at the inlet and at the outlet ports of exchanger 55 exceeds a predetermined value. When this value is reached, increasing the cooling water flow through the exchanger will not provide additional cooling capacity. Accordingly, when this value is reached, function 158 assumes control of cooling water valve 65 and prevents the temperature differential from increasing.

More specifically, function 158 receives as a measurement input on lead 156, the output of difference function 150. Difference function 150 forms the difference of the temperatures between the inlet and outlet ports of heat exchanger 55. These temperature signals are provided, via lines 142, 152 from transmitter 143 (which monitors the cooling water outlet temperature of heat exchanger 55) and, via lines 144, 149 from transmitter 145 (which monitors the cooling water inlet temperature of heat exchanger 55).

In response to the signals from difference function 150 and a setpoint value provided from the microprocessor controller, function 158 produces an output signal on lead 159 which can be used to control valve 65 to reduce the temperature differential between the water inlet and water outlet ports of exchanger 55. The output signal of function 158 is provided to high-select function 160 which selects the higher of the signal produced by functions 114 and 158.

The output signal of high-select function 160 is, in turn, provided to cooling water control valve 65. As with glycol control valve 62, valve 65 is a proportional mechanical valve. In response to a current input generated by high-select function 160 valve 65 proportionally controls the cooling water flow through heat exchanger 55.

A final function provided by the software routines in the microprocessor controller is used to drain cooling water from heat exchanger 55 when it is not being used to prevent damage. This latter function is carried out by compare functions 164 and 168 and timer 172. In particular, compare functions 164 and 168 receive, via lines 142 and 166, the output of temperature transmitter 143 which monitors the output water temperature of exchanger 55. When this outlet temperature falls below setpoint temperature "T1" (provided to compare function 164 via line 162 from the microprocessor controller) timer 172 is activated.

Alternatively, when the outlet water temperature of exchanger 55 exceeds setpoint temperature "T2" (provided to compare function 168 via lead 170) timer 172 is also activated. When timer 172 is activated it provides an output signal on line 174 to operate drain control valve 176. This valve is similar to glycol control valve 60 and is either fully opened or fully closed. When actuated valve 176 drains cooling water from exchanger 55 into drain port 83. This operation prevents damage to exchanger 55 by freezing or boiling of the cooling water. Timer 172 operates for a predetermined time interval to allow the water to drain out of heat exchanger 55 and then resets.

In the illustrative embodiment, the control functions shown in schematic form in FIG. 6 are implemented by programmed routines in the microprocessor controller. Flow charts showing the steps performed in each program routine to perform the functions depicted in FIG. 6 are shown in FIGS. 7-11. The routine steps shown in FIGS. 7-11 are descriptive functional steps. These steps must be translated into a machine language which directly controls the microprocessor controller. This conversion process is well-known and will not be described in detail. Generally once routine flow diagrams, such as those shown in FIGS. 7-11 are composed, translation of these flow diagrams into machine language can be performed by other computer programs which are conventional and described in literature provided by the manufacturers of the controller equipment. After the machine language control programs have been generated they must be loaded into the memory of the controller in a well-known process known as "configuring" the controller. Finally, the various setpoint values for a particular process to be controlled must be inserted into the controller's memory in a process known as "tuning". The configuring and tuning processes are well-known and will not be described in detail hereinafter.

Figure 7:
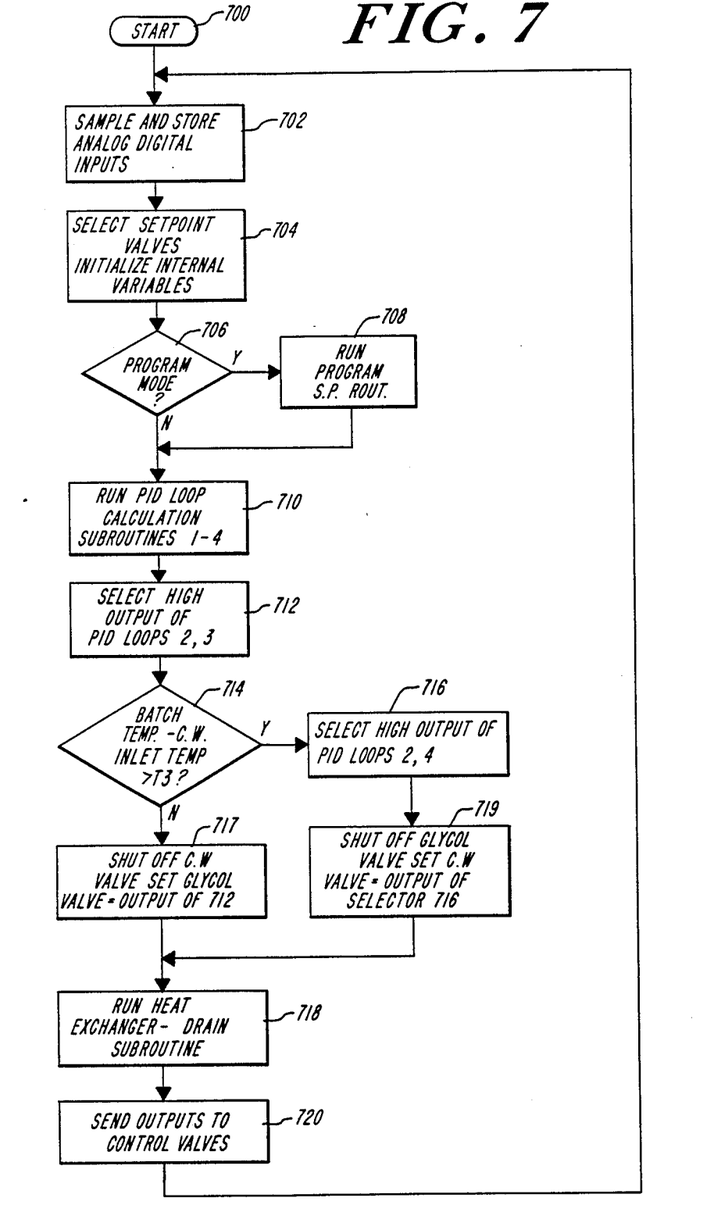
FIG. 7 is a portion of a logic flow diagram which diagrams the steps in the computerized controller main program loop used to control the illustrative temperature control system.

FIG. 7 shows a flow chart of the steps performed by the microprocessor controller in processing the inputs received from the selector switches and the temperature transmitters to generate outputs used to control the steam, glycol and cooling water control valves. The steps shown in FIG. 7 comprise the main loop of the controller program. These steps are repeated in sequence for the entire time that the controller is operational. In performing the steps the program repeatedly checks inputs, calculates new outputs and then forwards the outputs to the control valves.

Referring to FIG. 7, the main loop of the program comprises a plurality of steps and subroutines. These steps are performed and the subroutines are executed in response to the conditions of various variables in the system as will hereinafter be described. In particular, the main routine starts with step 700. The routine then proceeds to step 702 in which analog and digital inputs to the microprocessor controller are sampled and stored. In the illustrative embodiment, the analog inputs consist of seven analog signals; five of the signals are generated by the temperature transmitters shown in FIG. 6 as elements 6, 41, 42, 143, and 145, and the remaining two signals are setpoint signals received from local and remote consoles. The temperature transmitters transmit signals which indicate the batch temperature, the vessel jacket inlet and outlet temperatures and the cooling heat exchanger inlet and outlet temperatures. Obviously, additional inputs could be added as necessary.

In the illustrative embodiment, the microprocessor controller also receives four digital input signals. These signals consists of the state (open/closed) of four switches. These switches include a stop/start switch which controls the operation of the entire system, a local setpoint switch which, when closed, indicates that the system is to operate with setpoint information provided from a local console, a remote setpoint switch which, when closed, indicates that the system is to operate with setpoint information provided from a remote console and a batch/jacket switch which indicates whether the system is to operate in either the batch mode or the jacket mode. As previously mentioned, the above signals are sampled and converted to digital signals by well-known circuitry in the microprocessor controller.

After storing the input signals, the routine proceeds to step 704, in which the states of the various switches are decoded to select the setpoint variables which are to be used in controlling the system and various internal variables needed for the computations of the output signals are initialized.

The routine proceeds to step 706 in which decides whether the system is operating in the programmed setpoint mode (this is determined by examining the values of the local and remote setpoint switches—if neither is closed, the system is operating in the programmed setpoint mode). If the system setpoint is to be determined by a routine in the microprocessor controller program, in step 708, the program setpoint subroutine is run.

Figure 8:
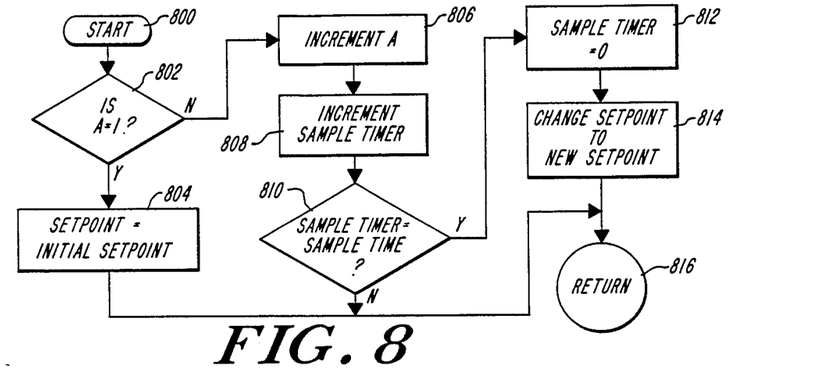
FIG. 8 is another portion of the logic flow diagram which diagrams the steps in the programmed setpoint subroutine used to control the illustrative temperature control system.

The programmed setpoint subroutine is shown in detail in FIG. 8. This subroutine allows the controller to change the setpoint of the system at variable time intervals and to hold the system at the temperature determined by that setpoint for fixed periods of time. In particular, the programmed setpoint subroutine starts in step 800 and the program thereupon proceeds to step 802 in which an internal loop variable (A) is checked for an initial value (1). If the internal loop variable indicates that the subroutine has not been executed previously, the routine proceeds to step 804 in which the system setpoint is set to an initial setpoint which is stored in the controller memory during controller tuning. The routine then proceeds to step 816 in which it returns to the main program loop.

Alternatively, if the loop variable A indicates that the subroutine has been previously run, the routine proceeds to step 806 in which the loop variable A is incremented. The routine then proceeds to step 808 in which a sample timer is incremented. The sample timer determines the duration of time for which a particular setpoint is to be held by the system. In order to determine whether this time duration has elapsed, the sample timer is compared to a stored sample time in step 810. If the stored sample time is not elapsed, the routine proceeds to step 816 in which it returns to the main program loop.

If, on the other hand, the predetermined sample time interval has elapsed, the routine proceeds to step 812 in which the sample timer is set to zero. The routine then proceeds to step 814 in which the system setpoint is changed to a new setpoint. The value of this new setpoint is retrieved from the controller memory based on the value of the loop variable "A". The routine then proceeds to step 816 and returns to the main program loop.

Thus, by storing a string of setpoint values each associated with a particular value of the variable "A", the routine can change the system setpoint to a variety of values for predetermined times. This subroutine allows flexibility in operating the system in order to tailor system to a particular chemical process.

Returning to the main program loop in FIG. 7, after running the programmed setpoint subroutine, the routine proceeds to step 710 in which a subroutine is run for each PID control loop to calculate the values of the output variables which are used to control the steam, glycol and cooling water flow control valves. As previously described, there are four PID control loops, two of which are associated with the temperature control of the reactor vessel, another of which is associated with protection of the reactor vessel lining and a fourth which is associated with conserving energy use by selecting either the central refrigeration unit or the cooling heat exchanger to cool the system.

Figure 9:
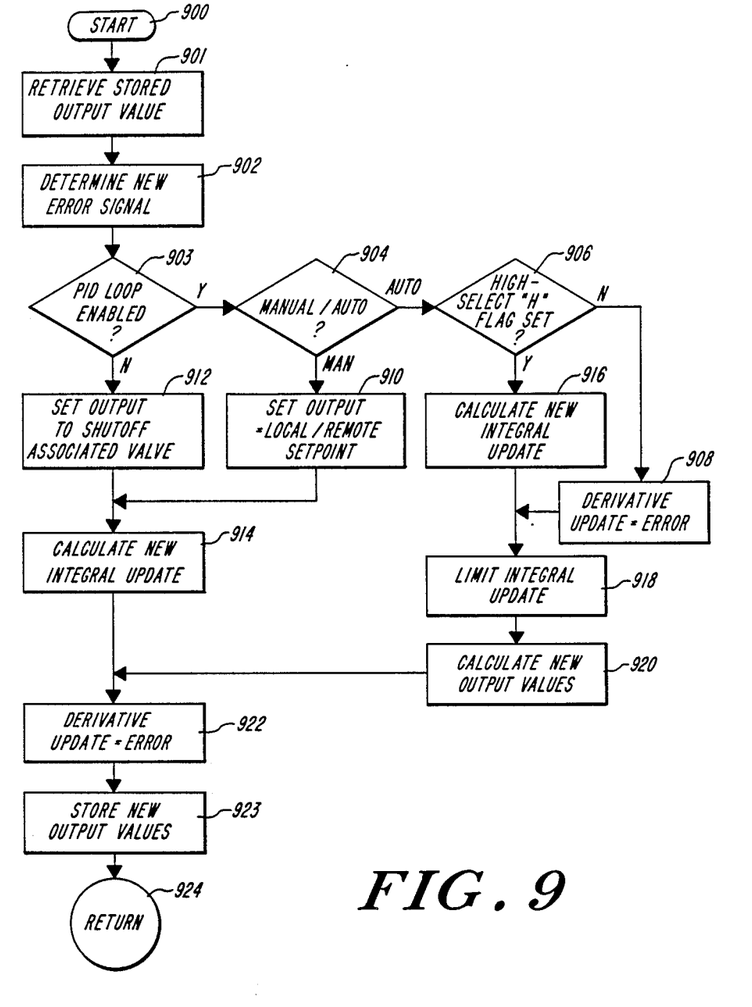
FIG. 9 is another portion of the logic flow diagram which diagrams the steps in the PID loop calculation subroutine used to control the illustrative temperature control system.

A typical PID loop calculation routine is shown in FIG. 9. A similar subroutine is used to calculate the output signal for each of the four PID loops.

Referring to FIG. 9, the PID loop subroutine starts in step 900 and proceeds to step 901 in which the value of the loop output variable stored during the last execution of the subroutine is retrieved from the controller memory. In step 902, a new error value is determined by subtracting the measurement input value to the loop from the loop setpoint. For example, for PID loop 1, the batch temperature is subtracted from the batch setpoint to provide the error signal.

In step 903, an internal variable is checked to determine whether the loop is enabled. Various loops are enabled or disabled under control of the system selector switches. For example, if the stop/start selector switch is in the "stop" position, all PID loops are disabled. Similarly, if the batch/jacket selector switch is set to the "jacket" position, PID loop 1 is disabled while PID loop 2 is enabled.

If the particular PID loop is disabled, the routine proceeds to step 912 in which the output is set to close the associated valve. The routine then proceeds to step 914 in which an internal integral value is updated in a conventional fashion. This integral value is used during subsequent execution of the subroutine to determine successive values of the output signal.

The routine then proceeds to step 922, in which an internal derivative update value is set equal to the current error. In step 923, the new output value as determined by the loop is stored in the controller memory and the routine returns to the main program loop in step 924.

If, in step 903, the PID loop was enabled, the routine proceeds to step 904 in which it checks to see whether the PID loop is to be controlled automatically or is to be controlled via a manual setpoint. Some PID loops, such as loops 3 and 4, always operate automatically so that step 904 is bypassed for these loops. However, in PID loops 1 and 2 the setpoint may be operated in a manual mode in which the loop setpoint is provided by a local or remote console. If the PID loop is operating in the manual mode, the routine proceeds to step 910 where the output is set equal to the appropriate local or remote setpoint (as determined by the states of the selector switches) and the routine proceeds to step 914 in which the integral update value is calculated as previously described.

Alternatively, if the PID loop is operating in an automatic mode, the routine proceeds from step 904 to step 906 in which the routine checks to see whether the high-select flag "H" is "set" (equal to "1"). The high-select flag is set by the high-select subroutine, and, as will hereinafter be described, the high-select routine selects the output of one of a pair of PID loops used to control the system. The flag is used to disable the integrating portion of PID loop which is not selected to prevent a phenomenon known as "windup" in which the non-operating PID loop attempts to generates outputs when it is not in control of the system. Eventually these outputs reach their extreme values and cause a "bump" in control when control is returned to the non-operating loop.

If the high-select flag is "set", indicating that the loop has been selected to provide output signals, the routine proceeds to step 916 in which a new integral update value is calculated in a conventional fashion from the new error signal. Proceeding to step 918, the value calculated in step 916 is limited to a preselected range to prevent the system from running away.

In step 920, the routine calculates a new output value (again in a conventional fashion) from the system gain integral update value, error signal and other system constants.

The routine then proceeds to step 922 in which the derivative update value is set equal to the new error signal and, in step 923, the new output value is stored in the controller memory. The routine then returns to the main program loop in step 924.

Alternatively, if in step 906 the routine determines that the high selector flag has not been set, (indicating that the output of the PID loop has not been selected by the high-select routine), the routine proceeds to step 908 in which the derivative update value is set equal to the new error signal. The routine then bypasses step 916 (integral update calculation) and proceeds to steps 918 and 920. The bypassing of step 916 effectively converts the control loop into a proportional (P) loop rather than a PID loop. This conversion prevents windup of the loop during the time in which the output of the loop is not selected. The routine then executes steps 918, 920, 922 and 923 as previously described.

In the main program loop (FIG. 7), after the new output values for the four PID loops have been calculated and stored, in step 710, the routine proceeds to step 712 in which one output from the stored values of PID loops 2 and 3 is selected by means of the high-select subroutine. As previously mentioned, the output of control loop PID 3 monitors the temperature differential between the input of the reactor vessel jacket and the internal reactor temperature. If the value of PID loop 3 exceeds the value of the PID loop 2, this indicates a situation in which the temperature differential between the reactor jacket input and the batch temperature has exceeded a predetermined value. In this case, in order to prevent damage to the reactor lining, the output of loop PID 3 is selected and used to control the system until the differential between the jacket input and the reactor temperature is brought back to an acceptable limit.

Figure 10:
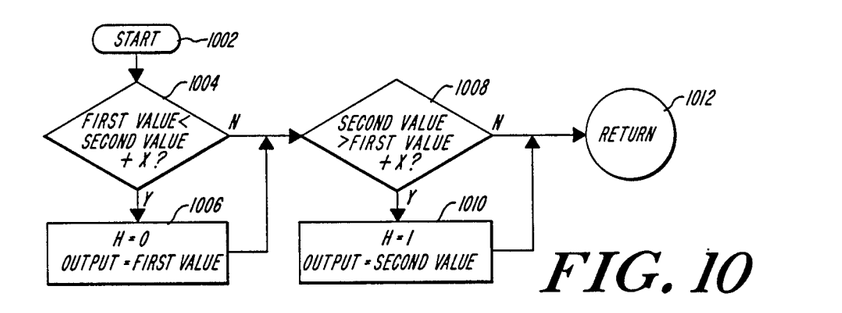
FIG. 10 is another portion of the logic flow diagram which diagrams the steps in the high-select subroutine used to control the illustrative temperature control system.

The high-select subroutine is shown in FIG. 10. Its function is merely to compare two input values and to select the highest value. In addition, the subroutine sets the internal high-select flag "H" which, as previously described, disables the unselected PID loop to prevent windup.

In particular, the high-select routine starts in step 1002 and proceeds to step 1004. In step 1004, the first input value is compared to the second input value plus a "deadband" value (X). If the first input value is less than the second value plus the deadband value, the routine proceeds to step 1006 in which the high-select flag (H) is set equal to "0" and the output of the subroutine is set equal to the first input value. The routine then proceeds to step 1008 in which the second input value is compared to the first input value plus the deadband value. If the second input value is not greater than the first input value plus the deadband value, the routine returns to the main program loop in step 1012.

Alternatively, if the second input value is greater than the first input value plus the deadband value (as determined in step 1008), the routine proceeds to step 1010 in which the high-select flag H is set equal to "1" and the output of the high-select subroutine is set equal to the second input value. The routine then returns to the main program loop in step 1012.

The function of steps 1004 and 1008 is to set the output of the routine equal to the value which has the highest magnitude, provided that this value exceeds the value of the other variable by the deadband value X. The value X provides a hysteresis or deadband to prevent the output of the subroutine from rapidly switching back and forth between the input values if the system is operating close to the changeover value.

Referring again to FIG. 7, in the main program loop after the high-select subroutine has been run in step 712, the routine then proceeds to step 714 which determines whether the cooling water heat exchanger or the central refrigeration unit is to be used to cool the heat transfer fluid. As previously described, this determination is made by forming the difference of the batch temperature and the cooling water inlet temperature at heat exchanger 55 and comparing this to a predetermined setpoint temperature, T3. If the difference between the batch temperature and the cooling water inlet temperature exceeds the predetermined value T3 indicating that cooling water is to be used, the routine proceeds to run the high-select subroutine in step 716. This subroutine (shown in FIG. 10 and previously described) and is used to select between the outputs of PID loop 2 and PID loop 4. In accordance with the invention, high-select subroutine step 716 allows the temperature control system to save energy by controlling cooling water valve 65 from either the output of PID loop 2 or the output of PID loop 4.

After selecting whether the output of PID loop 2 or PID loop 4 will control cooling water valve 65, the routine proceeds to step 717, in which the glycol valve is shut off and the cooling water value output signal is set equal to the output of the PID loop selected by step 716. The routine then proceeds to step 718 in which the heat exchanger drain subroutine is run.

Alternatively, if, in step 714, it is determined that the central refrigeration system is to be used to cool the system, the routine proceeds to step 719 in which the cooling water valve is shut off and the glycol valve output signal is set equal to the PID loop output selected by the high-select subroutine in step 712. The routine then proceeds to step 718.

In step 718, in accordance with the invention, the system monitors the cooling water heat exchanger to drain the heat exchanger if the temperature differential between the inlet and outlet is either above, or below, predetermined temperature setpoints.

Figure 11:
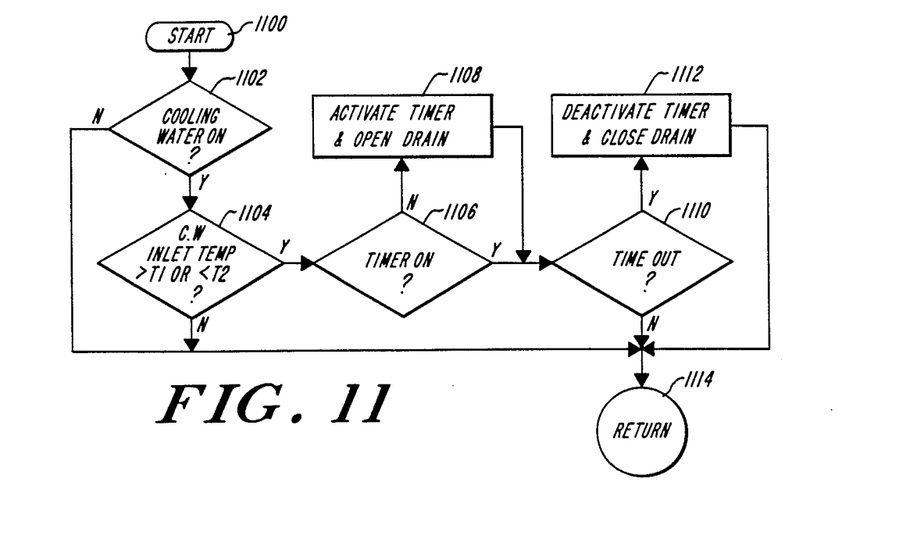
FIG. 11 is another portion of the logic flow diagram which diagrams the steps in the cooling water drain subroutine used to control the illustrative temperature control system.

The subroutine which controls the drain valve at the heat exchanger 55 is shown in FIG. 11. The drain subroutine starts in step 1100 and proceeds to step 1102. In step 1102 the routine monitors the value of the cooling water valve output to determine whether the cooling water is turned on. If cooling water is not running through the heat exchanger, the heat exchanger has already been drained in a previous pass through the main loop and, thus, the subroutine returns to the main routine in step 1114.

Alternatively, if the cooling water valve is open, the routine proceeds to step 1104 in which the cooling water inlet temperature is compared to two temperature setpoints "T1" and "T2". If the cooling water inlet temperature is greater than the setpoint "T1" or less than setpoint "T2", the routine proceeds to step 1106. If the cooling water inlet temperature falls within the range T1-T2, the routine returns to the main program loop via step 1114.

Assuming that the temperature of the cooling water inlet falls outside the temperature range defined by setpoints "T1" and "T2", in step 1106, an internal timer is checked to see whether it is running. If it is not running, the timer is activated and the drain valve (valve 176 in FIG. 6) is opened to allow cooling water to be drained out of the heat exchanger, thereby preventing damage to the heat exchanger by the freezing or boiling of the cooling water. The routine then proceeds to step 1110 in which the timer is checked for timeout. If no timeout has occurred, the routine returns to the main program loop in step 1114. On subsequent passes through the main program loop, the status of the timer will be rechecked. If, in step 1106, the timer is "on" and a timeout has occurred as determined in step 1110, the routine proceeds to step 1112 in which the timer is deactivated and the drain valve is closed indicating that the heat exchanger is fully drained. The routine then returns to the main program loop in step 1114.

After the heat exchanger drain subroutine has been run, in step 718, the main program loop proceeds to step 720 in which the newly-calculated output valve control values are forwarded to the various flow control valves. In particular, in a conventional fashion, the internal stored digital signals are converted to appropriate analog signals which are then applied to the control valves to control the system. Such a conversions are performed by conventional digital/analog converters which will not be discussed in detail herein.

Although, only one illustrative embodiment of the invention has been described in detail, other variations and modifications within the spirit and scope of the invention will become immediately apparent to those skilled in the art. For example, the above-described control system can be implemented in either electromechanical, pneumatic or electronic construction providing that the functions described are properly implemented. Similarly, the inventive features of the invention including the reactor vessel protection arrangement, the energy conservation control arrangement and the series cooling and heating heat exchangers could be separately implemented in a particular system or implemented in any combination.

What is claimed is:

1. Temperature control apparatus for controlling the temperature of a manufacturing vessel in a manufacturing plant having a source of refrigerant and a source of cooling water, said temperature control apparatus comprising means for circulating a heat transfer medium around said vessel in a closed loop, a heat exchanger connected in said loop, means for circulating cooling water from said source through said heat exchanger, and means for adding refrigerant from said source to said loop to circulate with said heat transfer medium in said loop when the heat load generated by said vessel exceeds the cooling capacity of said exchanger.

2. Temperature control apparatus according to claim 1 wherein said adding means comprises means for detecting a first temperature of said vessel, means for detecting a second temperature of said cooling water from said source, means for forming the temperature difference between said first and second temperatures and means for injecting refrigerant into said loop when said temperature difference exceeds a predetermined amount.

3. Temperature control apparatus according to claim 2 further comprising means responsive to the temperature of said vessel for generating a control signal, means responsive to said control signal for controlling the temperature of said medium to cause the temperature of said vessel to approach a predetermined setpoint.

4. Temperature control apparatus according to claim 3 wherein a jacket surrounds said vessel, said medium circulating through said jacket, and wherein said controlling means comprises second means for controlling the flow of cooling water to said heat exchanger, and third means responsive to the temperature of the medium exiting said jacket and responsive to said control signal for controlling said injection means and said cooling water flow control means.

5. Temperature control apparatus according to claim 4 wherein said third controlling means comprises means responsive to said temperature difference for connecting said control signal to said injection means and said cooling water flow control means.

6. Temperature control apparatus according to claim 5 wherein said control signal connecting means further comprises means responsive to a second temperature differential between cooling water from said source and cooling water exiting from said heat exchanger for overriding said control signal when said second temperature differential exceeds a predetermined amount.

7. Temperature control apparatus according to claim 6 wherein said control signal generating means further comprises means responsive to a third temperature differential between the temperature of said vessel and the temperature of heat transfer medium entering said jacket for overriding said control signal when said third temperature differential exceeds a predetermined amount.

8. Temperature control apparatus according to claim 7 further comprising means for draining cooling water out of said heat exchanger when said heat exchanger is not in use.

9. Temperature control apparatus for controlling the temperature of a manufacturing vessel in a manufacturing plant having a heat source and a source of cooling water, said temperature control apparatus comprising means for circulating a heat transfer medium around said vessel in a closed loop, a first heat exchanger connected in said loop, means for connecting said first heat exchanger to said heat source, a second heat exchanger connected in series with said first heat exchanger in said loop, means for circulating cooling water through said second heat exchanger, means responsive to the temperature of said vessel for generating a control signal, and, means responsive to said control signal for controlling the temperature of said medium to cause the temperature of said vessel to approach a predetermined set point.

10. Temperature control apparatus according to claim 9 wherein said manufacturing plant has a refrigeration plant and said temperature control apparatus further comprises means for connecting said loop to said refrigeration plant when the heat load generated by said vessel exceeds the cooling capacity of said second exchanger.

11. Temperature control apparatus according to claim 10 wherein said connecting means comprises means for detecting a first temperature of said vessel, means for detecting a second temperature of said cooling water from said source, means for forming the temperature difference between said first and second temperatures and means for injecting coolant from said refrigeration plant into said loop when said temperature difference exceeds a predetermined amount.

12. Temperature control apparatus for controlling the temperature of a manufacturing vessel in a manufacturing plant wherein a jacket surrounds said vessel, said temperature control apparatus comprising means for circulating a heat transfer medium through said jacket, means responsive to the temperature of said vessel for generating a control signal, means responsive to said control signal for controlling the temperature of said medium to cause the temperature of said vessel to approach a predetermined setpoint, and means responsive to a temperature differential between the temperature of said vessel and the temperature of the heat transfer medium entering said jacket for overriding said control signal when said temperature differential exceeds a predetermined amount.

13. Temperature control apparatus for controlling the temperature of a manufacturing vessel in a manufacturing plant having a refrigeration plant and a source of cooling water, said temperature control apparatus comprising means for circulating a heat transfer medium around said vessel in a closed loop, a heat exchanger connected in said loop, means for circulating cooling water from said source through said heat exchanger, means responsive to the temperature of said vessel for generating a control signal, means responsive to said control signal for controlling the temperature of said medium to cause the temperature of said vessel to approach a predetermined setpoint, means for detecting the first temperature of the cooling water from said source, means for detecting the second temperature of the cooling water exiting from said heat exchanger, and means responsive to the temperature differential between said first temperature and said second temperature for overriding said control signal when said temperature differential exceeds a predetermined amount.

14. A method for controlling the temperature of a manufacturing vessel in a manufacturing plant having a refrigeration plant and a source of cooling water, said method comprising the steps of:
A. circulating a heat transfer medium around said vessel in a closed loop,
B. controlling the temperature of the medium in said loop by circulating cooling water from said source through said heat exchanger,
C. monitoring the temperature differential between cooling water entering the heat exchanger and the reactor temperature, and
D. connecting said loop to said refrigeration plant when the heat load generated by said vessel exceeds the cooling capacity of said exchanger.

15. A method for controlling the temperature of a manufacturing vessel in a manufacturing plant having a heat source and a source of cooling water, said method comprising the steps of:
A. circulating a heat transfer medium around said vessel in a closed loop having a first and a second heat exchanger connected in series,
B. heating the medium in said loop by connecting said first heat exchanger to said heat source,
C. cooling the medium in said loop by circulating cooling water through said second heat exchanger,
D. generating a control signal in response to the temperature of said vessel, and
E. controlling the temperature of said medium in response to said control signal to cause the temperature of said vessel to approach a predetermined set point.

16. A method for controlling the temperature of a manufacturing vessel in a manufacturing plant wherein a jacket surrounds said vessel, said method comprising the steps of:
A. circulating a heat transfer medium through said jacket,
B. controlling the temperature of said medium to cause the temperature of said vessel to approach a predetermined setpoint, and
C. controlling the temperature of said medium to maintain the temperature differential between the temperature of said vessel and the temperature of the heat transfer medium entering said jacket at a predetermined amount when said temperature differential exceeds said predetermined amount.

17. A method for controlling the temperature of a manufacturing vessel in a manufacturing plant having a refrigeration plant and a source of cooling water, said method comprising the steps of:
A. circulating a heat transfer medium around said vessel in a closed loop including a heat exchanger connected in said loop,
B. controlling the temperature of said medium to cause the temperature of said vessel to approach a predetermined setpoint by circulating cooling water through said heat exchanger, and
C. controlling the temperature of said medium so that the temperature differential between the temperature of cooling water entering said heat exchanger and the temperature of cooling water exiting said heat exchanger approaches a predetermined amount when said temperature differential exceeds said predetermined amount.

* * * * *